United States Patent [19]
Schmid

[11] Patent Number: 5,748,810
[45] Date of Patent: May 5, 1998

[54] ACOUSTO-OPTICAL TUNABLE WAVEGUIDE SWITCH HAVING BALANCED OPTICAL PATHS

[75] Inventor: Steffen Schmid, Milan, Italy

[73] Assignee: Pirelli Cavi S.p.A., Italy

[21] Appl. No.: 722,419

[22] Filed: Oct. 1, 1996

[51] Int. Cl.[6] .................................................. G02B 6/10
[52] U.S. Cl. .............................. 385/7; 385/16; 385/21
[58] Field of Search ...................................... 385/1, 2, 3, 4, 385/5, 7, 8, 9, 10, 16, 20, 21

[56] References Cited

U.S. PATENT DOCUMENTS 5,218,653  6/1993  Johnson et al. .

FOREIGN PATENT DOCUMENTS

| 0063175 | 10/1982 | European Pat. Off. | 385/7 |
| 0144190 | 6/1985 | European Pat. Off. | 385/7 |
| 60-166923 | 8/1985 | Japan | 385/7 |
| 61-51122 | 3/1986 | Japan | 385/7 |

OTHER PUBLICATIONS

IEEE Photonics Technology Letters, Nov. 1994, USA, vol. 6, No. 11, ISSN 1041-1135, pp.1335-1337.

*Primary Examiner*—John Ngo
*Attorney, Agent, or Firm*—Brooks Haidt Haffner & Delahunty

[57] ABSTRACT

A wavelength selective acousto-optical waveguide device comprises a first and a second optical path in an optical waveguide having a length different by an amount corresponding to a value $d=\pm\lambda(k+m)$ where d is the difference between the optical paths of the two waveguides, $\lambda$ is the wavelength of the optical signal, k is a number greater than 0 and less than 1; and m is 0 or a whole number, so as to create a phase shift between at least two parasitic components of the optical signal, such as to generate a destructive interference between the parasitic components.

10 Claims, 5 Drawing Sheets

ACOUSTO-OPTICAL TUNABLE WAVEGUIDE SWITCH HAVING BALANCED OPTICAL PATHS

The present invention relates to an acousto-optical tunable waveguide switch, with balanced optical paths.

In telecommunications networks with wavelength-division multiplexing, several optical transmission signals, or several channels, that are independent one from the other are transmitted in the same line, consisting, usually, of an optical fibre, by means of wavelength multiplexing, that is the simultaneous transmission of signals at different wavelengths by means of frequency division. The transmitted signals, or channels, can be either digital or analog and they are distinguished one from the other since each of them is associated with a specific wavelength. Inside the networks there are nodes wherein the signals are switched from optical fibre lines that come together at an optical fibre line node to optical fibre lines that branch out from the node. In order to address the signals inside a node, simplifying its architecture, it is possible to use wavelength selection optical commutators. At the output of the networks, in order to separate the individual signals again, filters are needed that are capable of transmitting a wavelength band centered on the wavelength of a signal and sufficiently narrow to block adjacent signals.

Integrated acousto-optical devices are known whose operation is based on the interactions between light signals, propagating in waveguides obtained on a substrate of a birefringent and photoelastic material, and acoustic waves propagating at the surface of the substrate, generated through suitable transducers. The interaction between a polarized optical signal and an acoustic wave produces a polarization conversion of the signal, that is, the rotation of the polarization of its TE (transversal electric) and TM (transversal magnetic) components.

In such acousto-optical devices, by controlling the frequency of the optical waves it is possible to tune the spectral response curve of the devices, which makes them suitable for being used as switches and as optical filters of the signals in optical telecommunications networks with wavelength-division multiplexing. These tunable switches and filters allow the selection of the signals to be changed and, thus, to reconfigure a network, without altering the cabling of the components.

These acousto-optical devices also allow the switching and simultaneous selection of different signals or channels, if the acoustic wave propagating at the surface of the substrate is the superimposition of different acoustic waves. In fact, the switches execute the combined switching of the signals at the wavelengths corresponding to the simultaneously applied frequencies and the filters have a pass band corresponding to the set of different wavelength intervals, determined by the frequencies of the acoustic waves.

Pohlmann et al. in IEEE Journal of Quantum Electronics (Vol. 27, No. 3, pages 602–607, Mar. 1991) describe an acousto-optical waveguide device, with wavelength selection, acoustically tunable, with a response independent of the polarization, that can be used as a (2×2) switch with two inputs and two outputs and as a filter.

The switch, shown in FIG. 4 of the article, comprises a substrate consisting of a crystal of lithium niobate ($LiNbO_3$), x-cut and with y-propagation, two parallel optical waveguides, two passive polarization splitters, an electro-acoustic transducer, an acoustic waveguide and acoustic absorbers. The optical waveguides and the electro-acoustic transducer form an acousto-optical mode conversion stage.

The electro-acoustic transducer is formed by interdigital electrodes capable of generating a radio-frequency (RF) surface acoustic wave with a central frequency of 180 MHz. The acoustic waveguide has a width of 150 microns and contains both optical waveguides. The acoustic absorbers serve to eliminate reflections of the acoustic wave and freely propagating waves.

The optical waveguides and the polarization splitters are formed by diffusion of titanium in the substrate and the channel of the acoustic waveguide is also formed by diffusion of titanium in areas that circumscribe it. The interdigital electrodes of the electro-acoustic transducer are formed through deposition by catodic spraying of tin oxide and indium oxide.

D.A. Smith et al. in Applied Physics Letters (Vol. 56, No. 3, pages 209–211, Jan. 1990) describe an acoustically tunable optical filter with polarization independent response, of the same type as the device of Pohlmann et al.. The filter by D.A. Smith et al. is made in a crystal of lithium niobate, x-cut and with y-propagation, 5 cm long and comprises two optical waveguides, spaced by 270 microns, an electro-acoustic transducer, consisting of interdigital electrodes, and two polarization splitters, consisting of directional couplers.

D'Alessandro et al. in IEEE Photonics Technology Letters (Vol. 6, No. 3, pages 390–393, Mar. 1994) describe an acousto-optical switch of the same type as the device of Pohlmann et al.. The switch of D'Alessandro et al. is made in an XY crystal of lithium niobate, 5 cm long, and comprises two optical waveguides, an electro-acoustic transducer, an acoustic waveguide wherein the optical waveguides are contained, and two passive polarization separators formed by means of protonic exchange /titanium diffusion and annealing. The switch operates with four signals having 4 nm-spaced wavelengths between 1546 nm and 1558 nm and four pilot radio frequencies having values of 175.89 MHz, 175.38 MHz, 174.86 MHz, 174.42 MHz, to select the four optical wavelengths.

John J. Johnson et al. in the U.S. Pat. No. 5,218,653 describe an acousto-optical device similar to that of D'Alessandro et al. (FIG. 2).

The acousto-optical devices described above operate as tunable 2×2 switches, with a response independent of the polarization.

If a channel at a given wavelength is selected, the optical signals at that wavelength, entering through an input, are addressed to the corresponding cross-state output and those entering through the other input are addressed to the corresponding other cross-state output (switch in the cross-state). The non-selected signals are addressed from an input to the corresponding direct output (switch in direct-transmission or parallel state, bar-state).

These devices operate as tunable pass band acousto-optical filters with polarization independent response in the cross-state switching condition, wherein only one input is used together with the corresponding cross-state output.

There are several drawbacks in the devices described above.

The devices consist of a single stage of acousto-optical conversion; in such a single stage the polarization conversion by interaction between optical signal and acoustic control wave in the two optical waveguides is accompanied by a frequency shift having a value equal to the frequency of the acoustic wave. Such a frequency shift, in the described configuration, has an opposite sign depending on the polarization of the optical signal and, thus, the two separate orthogonal polarization components have a positive and a negative shift, respectively.

The frequency shift of the optical signal from the acoustic conversion frequency can generate beat problems in telecommunications networks.

In order to limit the frequency shift of the two polarizations in the two optical waveguides, acousto-optical devices have been proposed wherein with each optical waveguide there is associated a respective acoustic waveguide.

H. Herrmann et al. in Proceedings 6th European Conference on Integrated Optics, pages 10.1–10.3, Apr. 1993 (ECIO '93, Neuchâtel, Switzerland) describe a 2×2 acousto-optical switch (FIG. 10) comprising two optical waveguides and two acoustic waveguides side by side, in each of which there is included an optical waveguide and wherein the surface acoustic waves are propagated in opposite directions.

John J. Johnson et al. in U.S. Pat. No. 5,218,653 describe an acousto-optical device similar to that of H. Herrmann et al. (FIG. 3).

An acousto-optical device of the type described by H. Herrmann et al. has been made by the Applicant. In this device two optical waveguides were connected to two polarization splitters coupling the polarization modes, connected to the waveguides with respective portions curved into an "S", and two acoustic waveguides each contained a respective optical waveguide. With each acoustic waveguide there was associated an electro-acoustic transducer, formed by interdigital electrodes. The two optical waveguides were about 18 mm long and spaced by 270 microns, the polarization splitters were about 5 mm long, the portions curved into an "S" were about 8 mm long with a radius of curvature of about 160 mm. The overall length of the device was about 60 mm.

With the device in the OFF state (direct transmission), total losses were detected of about 2 dB for the TM input and of 5 dB for the TE input, resulting in a polarization dependent loss (PDL) of 3 dB, due to the presence of four portions curved into an "S" for the connection of each polarization splitter. The crosstalk with respect to the completely crossed state ranged from −18 dB to −20 dB, in relation to the splitting ratio of the polarization splitters.

With the device in the ON state (cross-state), total losses of about 2 dB for the TM input and of 3 dB for the TE input were detected. The polarization dependent loss is lower due to the distribution of the switching losses on both polarizations.

The switching characteristic had a bandwidth of 2.0 nm and a first side lobe of −18 dB. The conversion efficiency was greater than 99% (for both optical waveguides considered separately). For an input signal polarized at 45° C. with respect to the normal to the surface of the substrate, the extinction ratio of the device was limited to about −16 dB, both as effect of an acoustic cross-coupling of the order of −17 dB of the coupled acoustic power, and as the average (total) conversion efficiency was reduced to about 80% due to the mismatch of the conversion wavelength from 0.2 nm to 0.5 nm.

In particular, it is seen that a certain component of the acoustic wave propagating in an acoustic waveguide interferes with the optical signal propagating in the side-by-side optical waveguide. This has involved an increase in the interport crosstalk in the direct-transmission state of about −18 dB.

In addition, the frequency shift, or mismatch, of the optical signal can have an absolute value that is different in the two optical waveguides, due to lack of homogeneity of the substrate. In fact, the material of the substrate and the material that defines the optical waveguides can have a non perfectly uniform birefringence, also due to imperfections during manufacturing, such as non-uniform thickness and/or width of the deposited layer of titanium or gradient in the diffusion temperature of the titanium layer. Small local variations in birefringence cause a difference in the peak wavelength switched between the two optical waveguides that is greater the greater the distance between the same waveguides.

Due to manufacturing imperfections of the two polarization splitters connected to the optical waveguides of the polarization conversion stage, with the device in the OFF state (direct transmission), the input signal Si, that is guided toward the direct-transmission output, is lowered by an amount that depends on the crosstalk a of the polarization splitters according to a splitting ratio $SR=\alpha(1-\alpha)$ where $\alpha$ is equal to about 0.3%. In the case where the two polarization splitters have the same characteristics, the parasitic or residual signal component from the first polarization splitter has the same order of intensity of the parasitic or residual component from the second polarization splitter. At the direct-transmission output there is a signal $Sb =(1-4\alpha)$ Si, neglecting propagation losses. Parasitic components of the signal Si are guided toward the cross-state output where there is a residual signal $Sc =4\alpha$ Si. At the (parallel) direct-state output there is a destructive interference between the parasitic components of the signal Si, while at the cross-state output there is constructive interference between the two parasitic components of the signal Si.

The presence of the residual signal at the output penalizes the total extinction ratio (ratio between the power at the output from the device for the attenuated polarization component and the total power at output), or interport crosstalk. In the device made by the Applicant, an increase has been detected of 5–6 dB of the total extinction ratio of the device with respect to the extinction ratio of a single polarization splitter. In fact, the extinction ratios of a single polarization splitter are equal to −25 dB, while the extinction ratio for the complete device, comprising the two splitters, is only −19 dB.

A similar noise takes place in the acousto-optical devices, described earlier, endowed with a conversion stage comprising a common electro-acoustic transducer for the two optical waveguides and a common acoustic waveguide for the same optical waveguides.

According to the invention, a wavelength selective acousto-optical waveguide device comprises a substrate in a birefringent and photoelastic material, on which there are obtained:

a) at least one polarization mode conversion stage of an optical signal in a preselected range of wavelengths, including
  a1) a first and a second optical waveguide path,
  a2) at least one first acoustic waveguide containing a part of at least one of said first and second optical waveguide path, and
  a3) first generating means of a surface acoustic wave associated with said first acoustic waveguide, b) a first and a second polarization selective element, placed upstream and downstream, respectively, of said conversion stage and optically connected to said first and second optical waveguide path, capable of separating in said first and second optical path two polarization components of said optical signal;

characterized in that said first and second optical waveguide path have optical lengths that are different one from the other, the difference being equal to a preselected value represented by $$d = \pm \lambda (k+m)$$

where d is the difference between the optical paths of the two optical waveguides, λ is the wavelength of said optical signal, k is a number greater than 0 but smaller than 1, and m is 0 or an integer;

in order to create a phase shift between at least a first and a second parasitic component of said optical signal exiting from said second polarization selective element, such that said parasitic components undergo a destructive interference.

In the acousto-optical device according to the invention, a difference d is created between the optical paths of the two waveguides equal to a preselected fraction of a wavelength, or odd multiples thereof, d=±λ(k+m). Preferably, m=0 so as to reduce to a minimum the dependence of the balance of the optical paths on the wavelength. The balance between the optical paths allows a phase shift to be obtained between two preselected parasitic components of the signal present at the cross-transmission output of the device. The phase shift has a value such as to cause a destructive interference between the two parasitic components of the signal that thus cancel one another out. This balancing of the optical paths allows a significant reduction to be obtained in the extinction ratio, or interport crosstalk, in the completely crossed state of the device.

Other advantages of the acousto-optical device according to the invention consist in a reduction in the background noise at wavelengths other than the central (tuning) wavelength and in a widening of the tuning band width.

The acousto-optical device according to the invention can be used as a tunable 2×2, 1×2 and 2×1 switch, with a polarization independent response, or as a polarization independent response tunable filter.

Features and advantages of the invention will now be illustrated with reference to embodiments of the invention represented as nonlimiting examples in the enclosed drawings, wherein.

Figure 1:
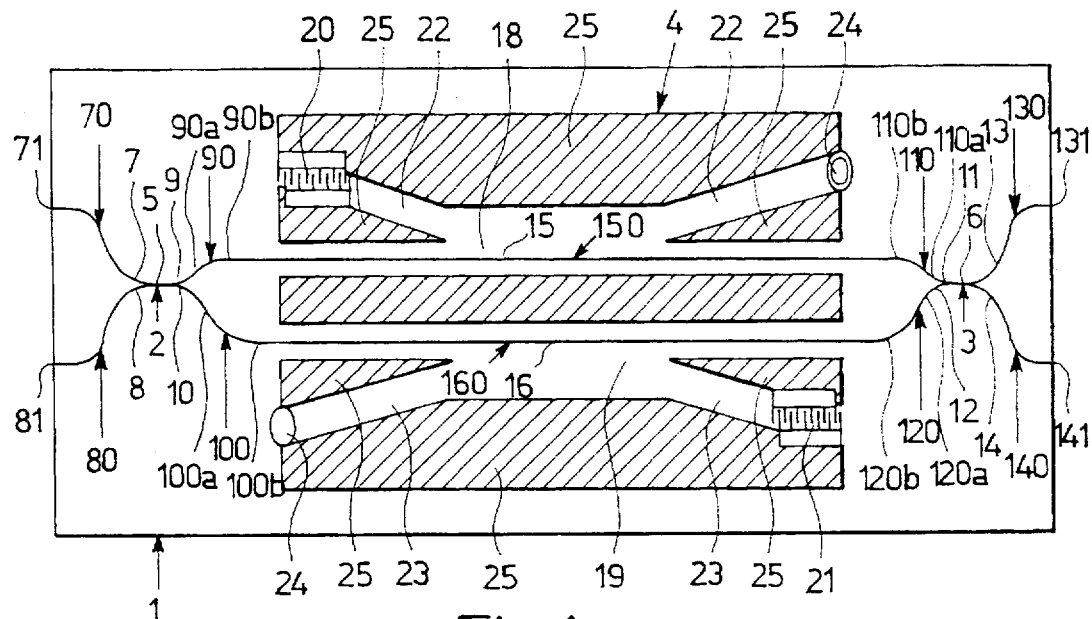
FIG. 1 is a diagrammatic representation of a tunable 2×2 acousto-optical switch, with a polarization independent response, made according to the invention.

There is shown in FIG. 1 a tunable 2×2 acousto-optical waveguide switch with a polarization independent response, made according to the invention. The switch comprises a substrate 1 in a birefringent and photoelastic material, consisting of lithium niobate (LiNbO₃).

There are obtained in the substrate 1 two polarization selective elements 2 and 3 and a conversion stage 4.

The two polarization selective elements 2 and 3 are formed by polarization splitters in an optical waveguide, each comprising respective central optical waveguide portions 5 and 6 and optical waveguide input and output branches 7, 8, 9, 10 for splitter 2 and 11, 12, 13, 14 for splitter 3, respectively.

The input branches 7 and 8 of splitter 2 are connected to input ports 71 and 81 of the switch through respective connecting optical waveguides 70 and 80. The output branches 13 and 14 of splitter 3 are connected to output ports 131 and 141 of the switch through respective connecting optical waveguides 130 and 140. The output branches 9 and 10 of splitter 2 are connected to respective connecting optical waveguides 90 and 100 each comprising two curved, or arched, portions with opposite convexity 90a, 90b and 100a, 100b. Similarly, the output branches 11 and 12 of splitter 3 are connected to respective connecting optical waveguides 110 and 120 each comprising two curved, or arched, portions with opposite convexity 110a, 110b and 120a, 120b. Portions 90a, 90b, 100a, 110b, 110a, 110b, 120a and 120b have for example a radius of curvature R ranging from 100 to 180 mm.

The input ports 71 and 81 and the output ports 131 and 141 are adapted to being connected to optical fibres of a telecommunications network, or to other optical components, by means of suitable connecting devices (called pigtailing), not shown, as they are of a known type. In relation to the characteristics of such connecting devices, ports 71 and 81 and ports 131 and 141 are, for example, at a distance of some 270 microns one from the other.

The conversion stage 4 comprises two rectilinear and parallel optical waveguide branches 15 and 16, two acoustic waveguides 18 and 19, containing the branches 15 and 16, and electro-acoustic transducers 20 and 21, respectively.

Branch 15 and corresponding optical connecting waveguides 90 and 110 and branch 16 and corresponding optical connecting waveguides 100 and 120 form two optical paths 150 and 160 that connect the polarization splitters 2 and 3.

The electro-acoustic transducers 20 and 21 are formed by interdigital electrodes, capable of generating two counter-propagating radio-frequency surface acoustic waves. The acoustic wave generated by transducer 20 is collinear with the signals traveling along the wavelength branch 15, while the acoustic wave generated by transducer 21 is counter-linear with the signals traveling along the wavelength branch 16. In order for the first and the second acoustic wave to have the same frequency, it is preferable that a single electrical driving signal be supplied to both the electro-acoustic transducers 20 and 21. The transducers 20 and 21 are placed in acoustic waveguides 22 and 23 that are side-by-side and in communication with the acoustic waveguides 18 and 19, respectively, so as to form an acoustic coupler. Such acoustic coupler is made so that the intensity profile of the surface acoustic wave along the waveguides 22 and 23 has a peak in the central portions of such guides and two troughs at the ends of the same guides. Optical signals propagating along branches 15 and 16 interact with a respective acoustic wave, having increasing intensity up to halfway along the path and decreasing intensity in the other half, in an area having a preselected interaction length. At the ends of the acoustic waveguides 22 and 23 there are acoustic absorber means 24 capable of eliminating reflections of the acoustic waves. The acoustic waveguides 18, 19, 22 and 23 are formed by means of areas 25 wherein the speed of the acoustic waves is higher than in guides 18, 19,22 and 23.

The overall length of the connecting optical waveguides 100,120 and of the branch 16 is greater than the overall length of the two connecting optical waveguides 90,110 and of the branch 15 by half the wavelength (λ/2), or odd multiples thereof, of the optical signal(s) that flow through the switch, so as to provide optical paths 150 and 160 having an overall length that differs by an amount equal to half a wavelength, or odd multiples thereof. In the illustrated embodiment, for optical signals having a wavelength of 1550 nm, the connecting optical waveguides 90, 110 and 100, 120 have a different overall length due to the fact that the curved portions 90a, 90b, 110a, 110b, 100a, 100b, 120a and 120b have the same radius of curvature and subtend corresponding angles at the center that are different, as shown in particular in FIG. 2.

Naturally the optical path 160 can be either greater or lesser by half a wavelength than the optical path 150.

The operation of the switch described above is as follows.

When no voltage is applied across the electro-acoustic transducers 20 and 21, the device is switched off (off-state) and it is in the condition of direct transmission or parallel state (bar-state) wherein there is a direct correspondence between the input ports 71 and 81 and the output ports 131 and 141, respectively. The light signals enter through ports 71 and 81 and arrive in the polarization splitter 2 where the polarization components TE (electrical transversal) and TM (magnetic transversal) are ideally separated in the output waveguide portions 9 and 10. The components TE and TM pass unaltered through branches 15 and 16 of conversion stage 4 and are then separated in output waveguide portions 13 and 14 of polarization splitter 3, so that the signals entering through ports 71 and 81 leave unchanged through ports 131 and 141.

Since the polarization splitters 2 and 3 are not ideal, when an optical signal Si is supplied to an input of the splitter, there is, in the branch of the splitter where there should be an absence of signal, a fraction of signal with a value α(splitter crosstalk), for example with a value of 0.3%. For example, if the splitter 2 has a crosstalk α1, for the TM polarization component of a signal with an intensity S1 supplied at input 71, for which a parallel (bar) passage through the splitter is provided, this means that in the branch 10 of the splitter, instead of no signal, there is a fraction with a value α1 S1 and, correspondingly, a signal with an intensity (1−α1) S1 in the branch 9. In turn, the splitter 3 has a crosstalk α2; then, for the polarization component TM there is, at its input in the branch 11, a signal with an intensity (1−α1) S1 and the crosstalk of the splitter 3 provides on output branch 13 (that is at the output 131 of the switch) a signal with an intensity Sb1=(1−α2) (1−α1) S1 and on the branch 14, that is at the cross-state output 141 of the switch, a signal with an intensity Sc1=α2 (1−α1) S1. At the input to the splitter 3, besides, there is in the branch 12 a component with an intensity α1 S1; such component, in turn, originates a signal in the branch 14 with an intensity Sc2=(1−α2) α1 S1 and in the branch 13 a signal with an intensity Sb2=α2 α1 S1.

If α1 and α2 are the same and if α² is considered negligible, one has respectively at the output 131: Sb1=(1−2α) S1 (loss at bar output is negligible), and at the output 141: Sc1=a(1−α) S1 (the crosstalk component in branch 16 of the converter α1 S1 passing directly through the splitter 3), and Sc2=a(1−α) S1 (the crosstalk through splitter 3 of the component (1−α1) S1 that has passed directly into branch 15 of the converter).

In the traditional case wherein the optical paths are the same in the two branches of the switch, the fields of the two components Sc1 and Sc2 add up (constructive interference) and, ideally, there is a signal intensity Sc(TM) =4 a S1.

The behaviour is similar for the polarization component TE of the optical signal at input.

In the switch according to the invention, wherein the two optical paths 150 and 160 are selected to be different by half a wavelength (or odd multiples thereof), the two components Sc1 and Sc2 are in complete phase opposition and thus originate a destructive interference. In fact, since the optical path 160 has a length greater than the optical path 150 by a fraction of a wavelength, in particular half a wavelength, the optical signal's parasitic components present in the connecting waveguide 140 are out of phase by 180° C. and interfere in a destructive manner, ideally canceling each other out. At the cross-state transmission output 141 there is, thus, a signal Sc substantially equal to zero, while at the direct-transmission output 131 there is a signal Sb substantially equal to S1 and the penalization due to the crosstalk of the polarization splitters 2 and 3 is thus practically eliminated.

By applying an appropriate switching signal to the electrodes of transducers 20 and 21, the device is switched on (on-state) and changes over to a condition of cross-state, wherein the input ports 71 and 81 correspond to the cross-state output ports 141 and 131, respectively. The transducers 20 and 21 generate a respective radio-frequency surface acoustic wave having an acoustic control frequency $f_{ac}$ (about 174 ±10 MHz for devices operating at 1550 nm and 210 ±10 MHz for those operating at 1300 nm) corresponding to the optical resonance wavelength, at which the polarization conversion TE →TM or TM →TE takes place. The light signals enter the polarization splitter 2 where the polarization components TE and TM are separated and pass through the branches 15 and 16 of the conversion stage 4 where they are converted into the state of orthogonal polarization. The polarization components TE and TM are then sent on into the polarization splitter 3 so that the selected polarization components from input port 71 can leave through output port 141 together with the unselected components from port 81 and the selected polarization components from port 81 can leave through output port 131 together with the unselected components from port 71. The signals, that in conversion stage 4 are subjected to a polarization conversion, are guided in the completely cross-state condition, to produce the function of total switching.

The two optical signal's parasitic components present in waveguide portion 140 are out of phase by 180° C. and interfere in a destructive manner, canceling each other out. There is a signal Sc at the cross-state transmission output 141 substantially equal to the signal converted in the optical waveguide 15, for example, S(TE). This signal S(TE) has a frequency shift whose sign is determined by the fact that optical signal and acoustic wave are either collinear or counter-linear. On direct-transmission output 131 there is a signal Sb due to two parasitic components of the optical signal converted in optical waveguide 15 and in optical waveguide 16. The two parasitic components have a respective intensity equal to α S(TE) and frequency shift with either a negative or a positive sign, respectively, according as to whether optical signal and acoustic wave are collinear or counter-linear. These two parasitic components of the signal produce a beat with a maximum intensity substantially equal to 4 α S(TE). In this way the average crosstalk of the polarization splitters is limited to about −22 dB.

Figure 2:
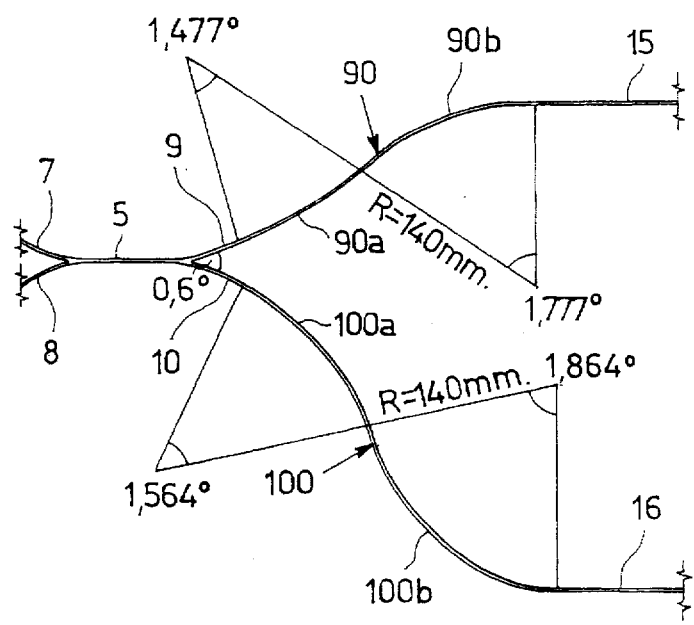
FIG. 2 shows on an enlarged scale portions of the waveguides of the switch of FIG. 1.

The Applicant has made a balanced acousto-optical switch, like the one of FIG. 1, for operation at a wavelength of 1550 nm, that has the following dimensions: the two optical waveguides 15 and 16 are about 18 mm long and are spaced by 270 microns. The curved portions 90a, 90b, 100a, 100b, 110a, 110b, 120a, 120b have a radius of curvature of about 140 mm. Portions 90a and 110a subtend respective angles at the center of about 1.477° C., portions 90b and 110b subtend respective angles at the center of about 1.777° C., portions 100a and 120a subtend respective angles at the center of about 1.564° C. and portions 100b and 120b subtend respective angles at the center of about 1.864° C. as shown in FIG. 2. The overall length of optical path 160 is greater by half a wavelength than the overall length of optical path 150. The polarization splitters 2 and 3 are about 5 mm long. The overall length of the device is about 60 mm.

Figure 7:
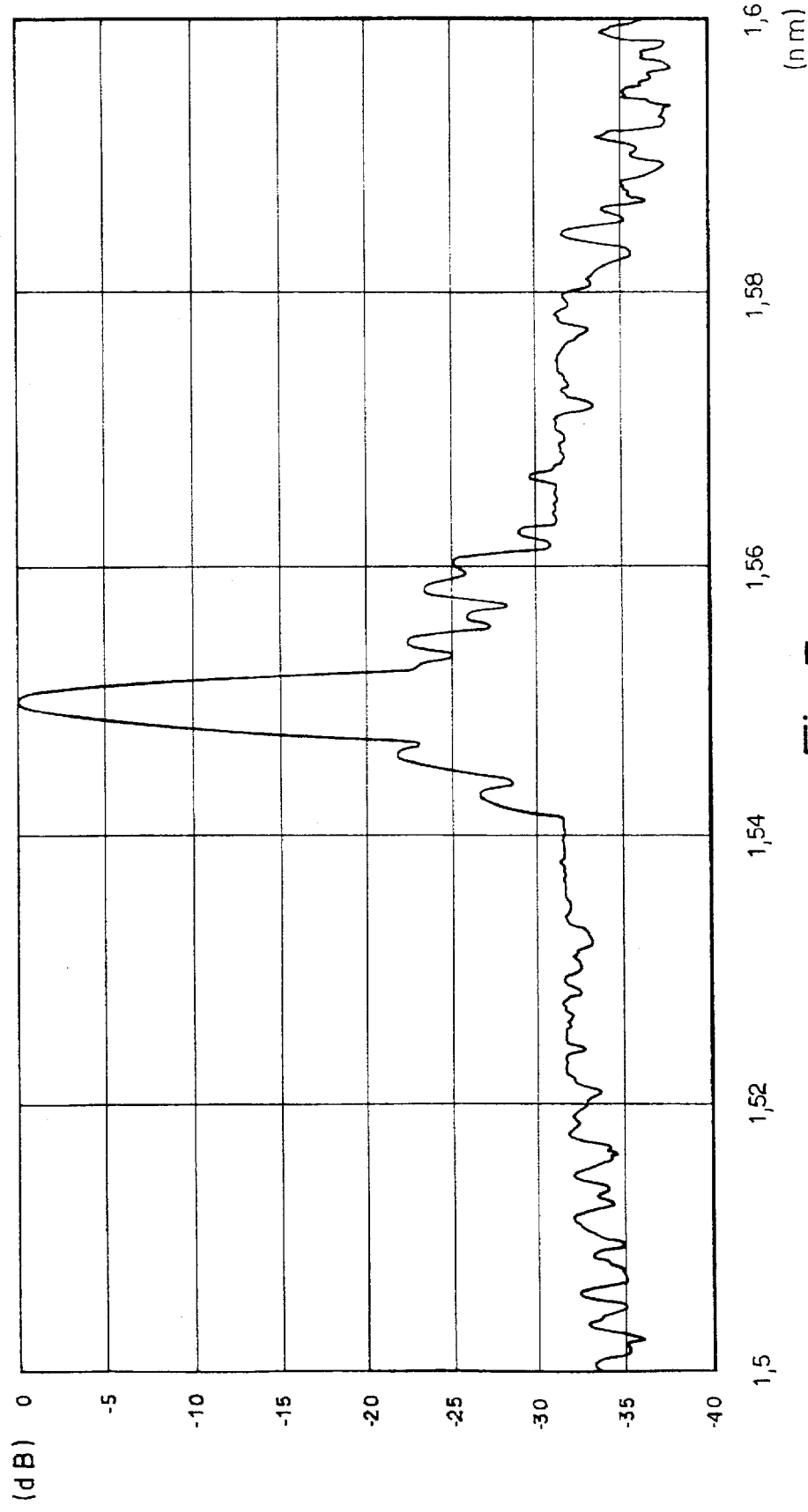
FIG. 7 is a graph of a filter curve of the acousto-optical switch of FIG. 1.

There is shown in FIG. 7 a spectrum of the filtering curve of the balanced acousto-optical switch in the state of cross transmission. The amplitude of the optical signal (transmission), expressed in dB, is plotted along the y-axis against the wavelength of the optical signal ($\lambda$), in nm, along the x-axis. It is seen that the background noise is less than or equal to −30 dB, the side lobes are less than or equal to −22 dB and the band width is 100 nm.

Figure 8:
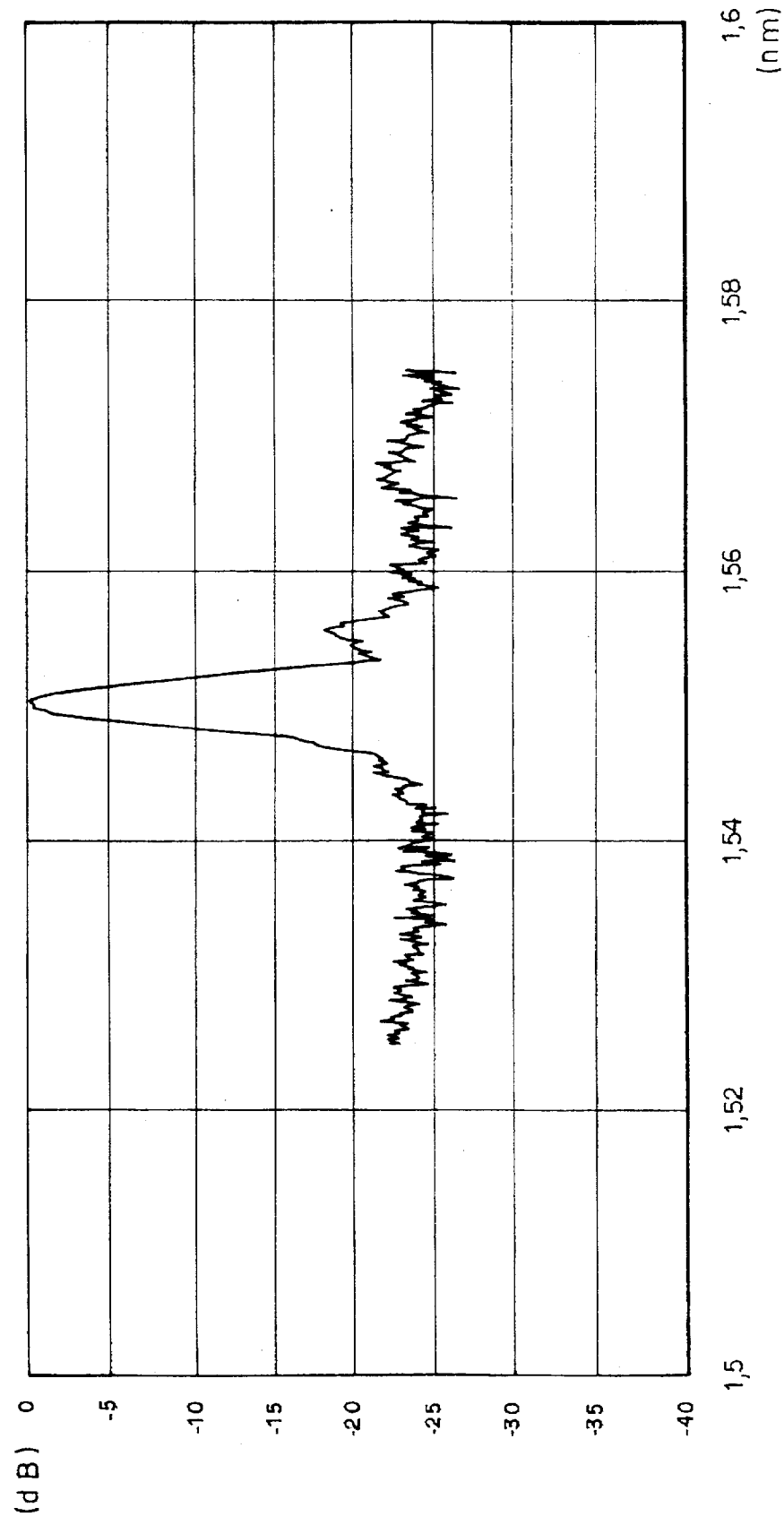
FIG. 8 is a graph of a filter curve of a traditional acousto-optical switch.

The improvement in performance obtained with the balanced acousto-optical switch appears obvious from the comparison with the graph of FIG. 8 wherein there is shown a spectrum of the filtering curve, in the cross-transmission state, of an acousto-optical switch with a structure similar to that of the switch of FIG. 1, but made in a traditional manner (with optical paths of equal length). The scale of the x- and y-axes of FIG. 7 coincides with that of the graph of FIG. 6 so that the two graphs can also be compared by superposing them. It is seen that the traditional switch has a worse performance than that of the switch of FIG. 1 because background noise is lower than or equal to −21 dB, the side lobes are about −18 dB and the bandwidth is 2 nm.

Of course the differences in the desired length of the optical paths can be obtained not only with arcs of different amplitude of the curved portions of optical waveguide, but also with different radii of curvature of the curved portions and different lengths of the rectilinear branches 15 and 16, according to the specific design requirements of the switch.

Figure 3:
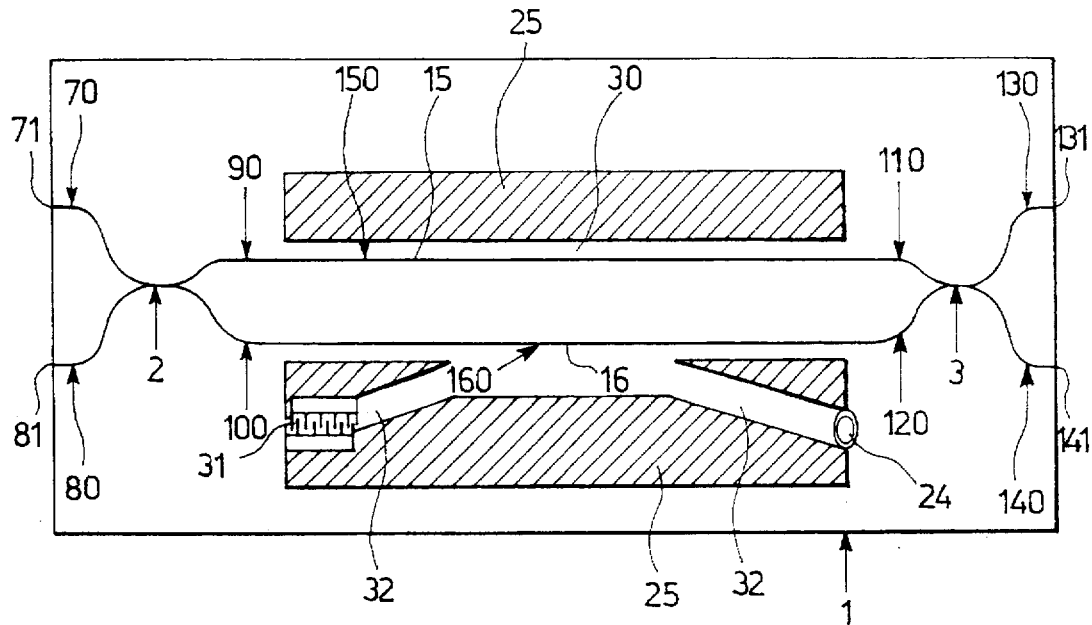
FIGS. 3, 4, 5 and 6 shows variants of the switch of FIG. 1.

There is shown in FIG. 3 a variant of the acousto-optical switch of FIG. 1 wherein the same parts are indicated with the same numbers. In the switch of FIG. 3 the branches of the optical waveguides 15 and 16 of conversion stage 4 are contained in a common acoustic waveguide 30. One electro-acoustic transducer only 31, located in a side-by-side waveguide 32, generates a surface acoustic wave that interacts with the two optical waveguides 15 and 16. The acoustic wave is collinear with the signals running along the waveguides 15 and 16. The acoustic waveguide 30 has a width of about 110 microns and the two optical waveguide branches 15 and 16 are placed at a distance of about 40 microns.

In this case, preferably, the optical path 160 has a length that is greater (or lesser) by a quarter of a wavelength ($\lambda/4$) than that of the optical path 150, so that a partially destructive interference takes place between the optical signal's parasitic components in the portion of the connecting waveguide 140.

When the device is switched on, the two polarization components separated in the two optical paths 150 and 160 are both propagated in the same direction as the acoustic signal and are thus subjected to a frequency shift of the same sign. At the cross-state transmission output 141 there is a signal Sc substantially equal to the signal converted in the optical waveguide 15, for example S(TE). This signal S(TE) has a frequency shift with a negative sign because optical signal and acoustic wave are collinear. A balance is thus obtained of the optical paths of the switch in the state of cross transmission. At the direct-transmission output 131 there is a signal Sb due to two parasitic components of the optical signal converted in optical waveguide 15 and in optical waveguide 16. These parasitic components of the signal have an intensity equal to $\alpha$ S(TE) and a phase shift of 90° C. ($\lambda/4$), resulting, thus, in a partially destructive interference. In this way the average crosstalk of the overall device is limited to about −22 dB.

If in the switch of FIG. 3 the optical paths 150 and 160 were to have a length different by half a wavelength (or odd multiples thereof, the parasitic components would add up constructively in the direct (bar) output of the switch, which would involve a significant limitation in the extinction ratio of the switch itself (of the order of about −19 dB).

Figure 4:
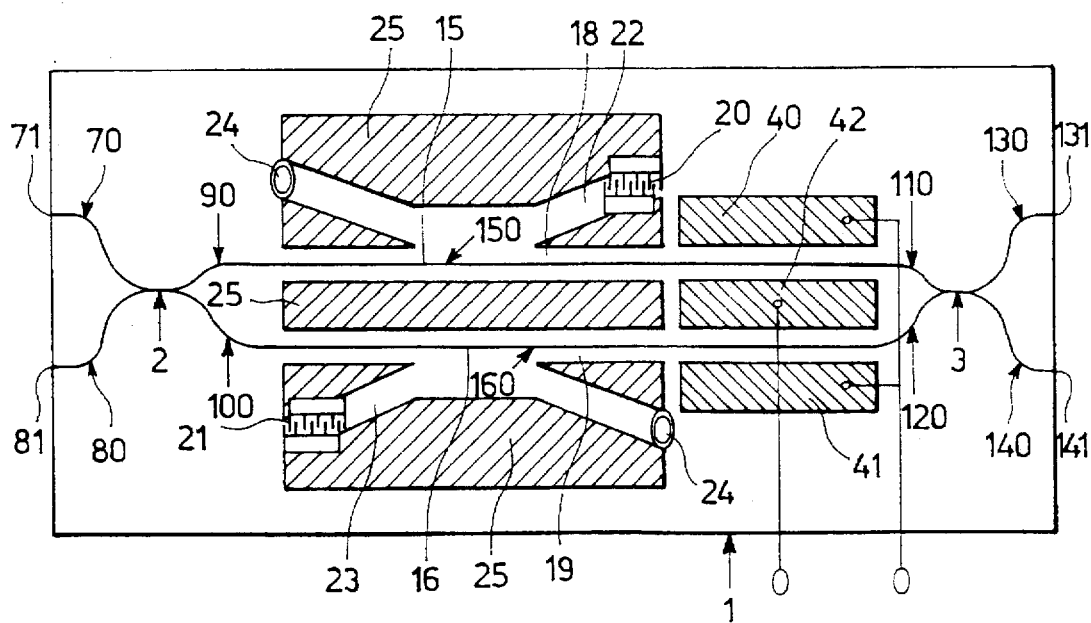

There is shown in FIG. 4 a variant of the acousto-optical switch of FIG. 1 wherein with the optical waveguide branches 15 and 16 there are associated two positive electrodes 40 and 41 and a common negative electrode 42. The electrodes 40–42 are formed by shaped strips of conductive material, such as Ti, Au, Al, deposited by evaporation or galvanic growth or sputtering. The electrodes 40, 41 and 42 are connected to a suitable source of electrical energy. The pairs of electrodes 40, 42 and 41, 42 generate two electrical fields that can be adjusted in intensity in order to modify the refractive index of the material of the substrate 1 so as to provide a fine tuning of the optical paths in branches 15 and 16.

Figure 5:
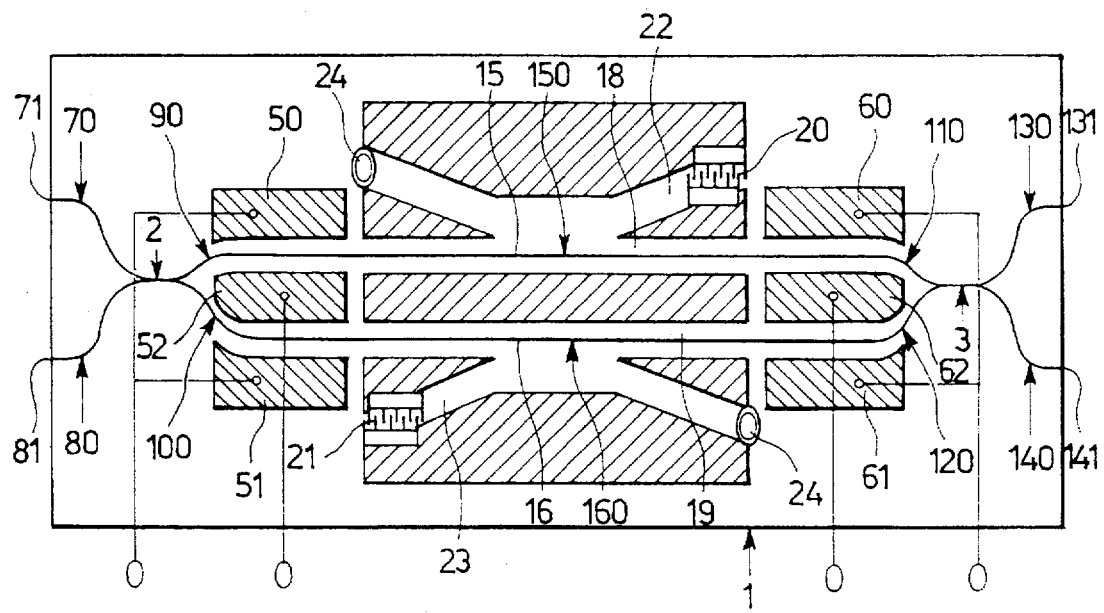

There is shown in FIG. 5 a variant of the acousto-optical switch of FIG. 1 wherein electrodes 50, 51, 52 and 60, 61, 62 are associated with the waveguide portions 90, 100, 110, 120. Electrodes 50–52 and 60–62 are formed by shaped strips of conductive material, such as Ti, Au, Al, connected to a suitable source of electrical energy. In this case, the pairs of electrodes 50 and 52, 51 and 52, 60 and 62, 61 and 62, that have the same functions as those described with reference to FIG. 4, are located at the optical connecting waveguides 90, 100, 110, 120 and thus allow the desired variation to be made to the optical path along the connections themselves without requiring any increases in the length of substrate 1.

Electrodes 40, 41, 42 of the switch of FIG. 4 and electrodes 50, 51, 52 of the switch of FIG. 5 allow, in particular, the compensation of any differences in behaviour between the two polarizations TM and TE, thanks also to the different sensitivities of the two components TM and TE to the action of the applied electrical field.

Figure 6:
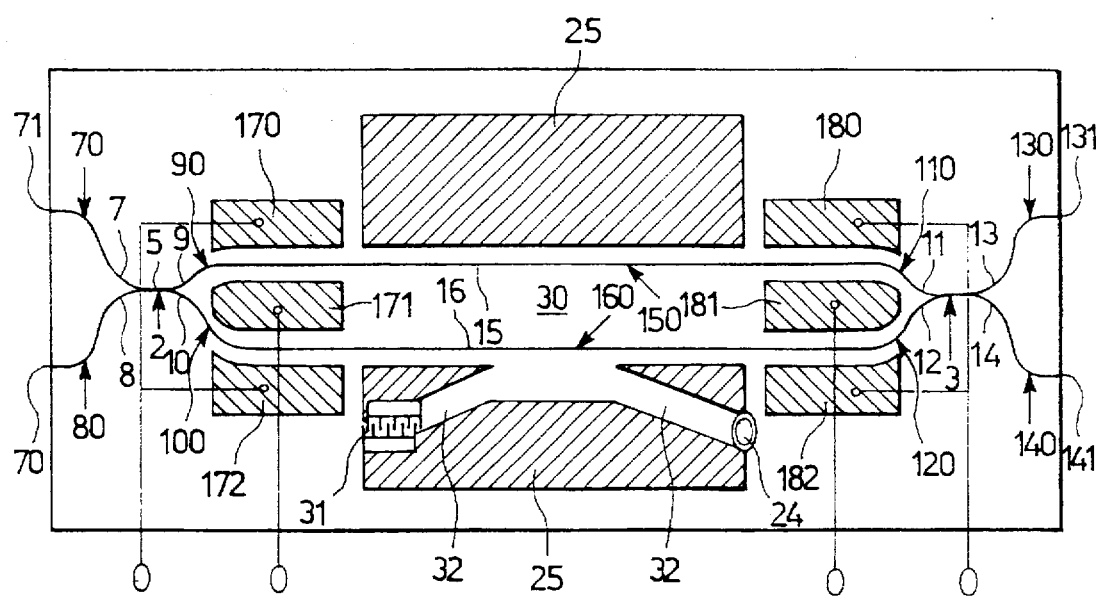

In a further embodiment of the switch, illustrated in FIG. 6, electrodes 170, 171, 172 and 180, 181, 182 are associated with a switch having a single acoustic waveguide, of the type already described with reference to FIG. 3. These electrodes, conveniently, are activated at the time the device is switched on. In this case it is possible to arrange optical paths 150 and 160 with a length that differs by $\lambda/2$ one from the other, so as to have the complete extinction of the parasitic components in the off state and to change, through the electrodes, the length of the optical paths only at the time when the device is switched on, thus reconstituting, even when the device is in the switched-on condition, the condition of complete destructive interference of the parasitic components, without penalizing the behaviour in the switched-off condition.

The switches of FIGS. 1, 3, 4, 5 and 6 operate correctly if input ports 71 and 81 and output ports 131 and 141 are exchanged and the latter act as input ports, while the former act as output ports.

The switches of FIGS. 1, 3, 4, 5 and 6 are capable of operating at room temperature within a range of optical wavelengths at least 100 nm wide centered on the wavelength of 1550 nm or of 1300 nm, that are particularly interesting for optical telecommunications.

The substrate 1 consists of a crystal of $LiNbO_3$ cut perpendicularly to the x-axis; the waveguide branches 15 and 16 are oriented along the y-axis of the crystal. Instead of $LiNbO_3$ another birefringent, photoelastic and piezoelectric material may be used, selected in the group $LiTaO_3$, $TeO_2$, $CaMoO_4$. The overall length of the devices is about 40–60 mm.

The acoustic waveguides 18, 19, 22, 23, 30, 32 can be made by means of a photo-lithography mask circumscribing strips 25 of substrate 1. Within the surface circumscribed by the mask apertures there have been executed a deposition of a Ti-layer with a thickness of 160 nm and a subsequent Ti-diffusion in the substrate for 31 hours in an oven at a temperature of 1060° C. Due to the effect of the diffusion, the speed of the acoustic waves has increased by about 0.3%, so that the areas 25 confine the acoustic waves along guides 18, 19 and 30.

The optical waveguides and the polarization splitters can be made by means of diffusion in the substrate of a substance capable of raising the refractive index. Using a photolithographic mask, it is possible to execute a deposition of a Ti-layer having a thickness of about 120 nm and a subsequent diffusion for 9 hours at a temperature of 1030° C. In correspondence to the optical waveguides, the mask has an aperture with a width of about 7 microns.

The optical and acoustic waveguides are preferably monomodal for the optical and acoustic waves used.

The interdigital electrodes of the electro-acoustic transducers 20, 21 and 31 are deposited on the (piezoelectric) substrate 1, with an inclination of about 5° C. to the y-axis. Preferably, the transducers have 15-20 or more pairs of interdigital electrodes with a periodicity of about 20.8 microns. Preferably, the electrodes have a variable pitch ("chirp") to widen the response band. The value of the periodicity derives from the value of the wavelength in $LiNbO_3$ of a surface acoustic wave with a frequency of about 173.5 MHz, which is the value needed for TE←- 43 TM conversion at an optical wavelength of about 1550 nm. By modifying the periodicity of the electrodes it is possible to provide transducers suitable for acousto-optical devices operating in other wavelength bands. The electrodes can be made by depositing on the substrate a metal layer, for example aluminium with a thickness of 500 nm.

It is possible to tune the acousto-optical switches to the wavelength of 1500 nm or 1600 nm, displaced by 50 nm with respect to the central wavelength of 1550 nm, by supplying to the interdigital electrodes a power of about 100 mW, against the 50 mW required for operation at the central wavelength.

Although described with reference to a switch of the 2×2 type, the present invention can find use in more complex components where optical paths are present between polarization splitters, by introducing adjustments, according to what known to a person skilled in the art.

I claim:

1. An acousto-optical waveguide device, selective in wavelength, comprising a substrate in a birefringent and photoelastic material, on which there are obtained:
   a) at least one polarization mode conversion stage of an optical signal in a preselected range of wavelengths, including
      a1) a first and a second optical path in an optical waveguide,
      a2) at least one first acoustic waveguide containing a part of at least one of said first and second optical path in the optical waveguide, and
      a3) first generating means of a surface acoustic wave associated with said first acoustic waveguide,
   b) a first and a second polarization selective element, placed upstream and downstream, respectively, of said conversion stage and optically connected to said first and second optical path in the optical waveguide, capable of separating in said first and second optical path two polarization components of said optical signal;

characterized in that said first and second optical path in the optical waveguide have optical lengths that are different one from the other, the difference being equal to a preselected value represented by $$d = \pm \lambda(k+m)$$

where d is the difference between the optical paths of the two optical waveguides,
$\lambda$ is the wavelength of said optical signal,
k is a number greater than 0 but smaller than 1, and
m is 0 or an integer;

in order to create a phase shift between at least a first and a second parasitic component of said optical signal exiting from said second polarization selective element, such that said parasitic components undergo a destructive interference.

2. An acousto-optical device according to claim 1, characterized in that said first and second optical path comprise a respective first and second rectilinear and parallel branch of an optical waveguide and respective connecting optical waveguides that connect said first and second branch with said first and second polarization selective element, said connecting optical waveguides of said first optical path having a length different from the length of said connecting optical waveguides of said second optical path by an amount corresponding to said value d.

3. An acousto-optical device according to claim 2, characterized in that said connecting optical waveguides of said second optical path have a length greater than said connecting optical waveguides of said first optical path by an amount corresponding to said value d.

4. An acousto-optical device according to claim 2, characterized in that said connecting optical waveguides comprise a respective pair of curved portions having a preselected radius of curvature and opposite convexity, said curved portions subtending angles at the center having a different value so that said second optical path has a length greater than said first optical path by said value d.

5. An acousto-optical device according to claim 4, characterized in that said curved portions have a radius of curvature ranging from 100 to 180 mm.

6. An acousto-optical device according to claim 1, characterized in that second generating means of a surface acoustic wave are associated with a second acoustic waveguide, said first acoustic waveguide containing at least a part of said first optical path, said second acoustic waveguide containing at least a part of said second optical path, said difference in length between said optical paths being equal to half a wavelength.

7. An acousto-optical device according to claim 1, characterized in that said first acoustic waveguide contains at least a part of said first and second optical path, said difference in length between said optical paths being equal to a quarter of a wavelength.

8. An acousto-optical device according to claim 2, characterized in that electrodes are associated with said first and second optical waveguide branch to generate electrical fields capable of modifying the refractive index of the material of said substrate and to execute a fine tuning of said optical paths.

9. An acousto-optical device according to claim 2, characterized in that electrodes are associated with said connecting optical waveguides of said first and second optical path to generate electrical fields capable of modifying the refractive index of the material of said substrate and to execute a fine tuning of said optical paths.

10. An acousto-optical device according to claim 1, characterized in that said first acoustic waveguide contains at least a part of said first and second optical path, said difference in length between said optical paths being equal to a quarter of a wavelength, electrodes being associated with said connecting optical waveguides of said first and second optical path to generate electrical fields capable of modifying the refractive index of the material of said substrate and to vary said length of said optical paths.

* * * * *

UNITED STATES PATENT AND TRADEMARK OFFICE
CERTIFICATE OF CORRECTION

PATENT NO. : 5,748,810
DATED : May 5, 1998
INVENTOR(S) : Schmid

It is certified that error appears in the above-identified patent and that said Letters Patent is hereby corrected as shown below:

Col. 3, line 49, change "45°C." to --45°--;

Col. 4, line 14, change "SR=$a$(1 )" to --SR=$a/$(1 )--

Col. 6, line 10, after "100a" insert --100b--;

Col. 8, line 3, change "180°C." to --180°--;

Col. 8, line 36, change "180°C." to --180°--;

Col. 8, line 61, change "1.477°C." to --1.477°--;

Col. 8, line 63, cancel "C.";

Col. 8, line 64, change "1.564°C." to --1.564°--;

Col. 8, line 65, change "1.864°C." to --1.864°--;

Col. 11, line 21, change "5°C." to --5°--;

Col. 11, line 28, change "TE$\Leftarrow$-43" to --TE$\Leftrightarrow$--;

Signed and Sealed this

Twenty-ninth Day of September, 1998

Attest:

BRUCE LEHMAN

Attesting Officer        Commissioner of Patents and Trademarks